July 9, 1929.  A. W. PARKER  1,720,491
FRUIT TREATING APPARATUS
Filed July 30, 1928  3 Sheets-Sheet 1
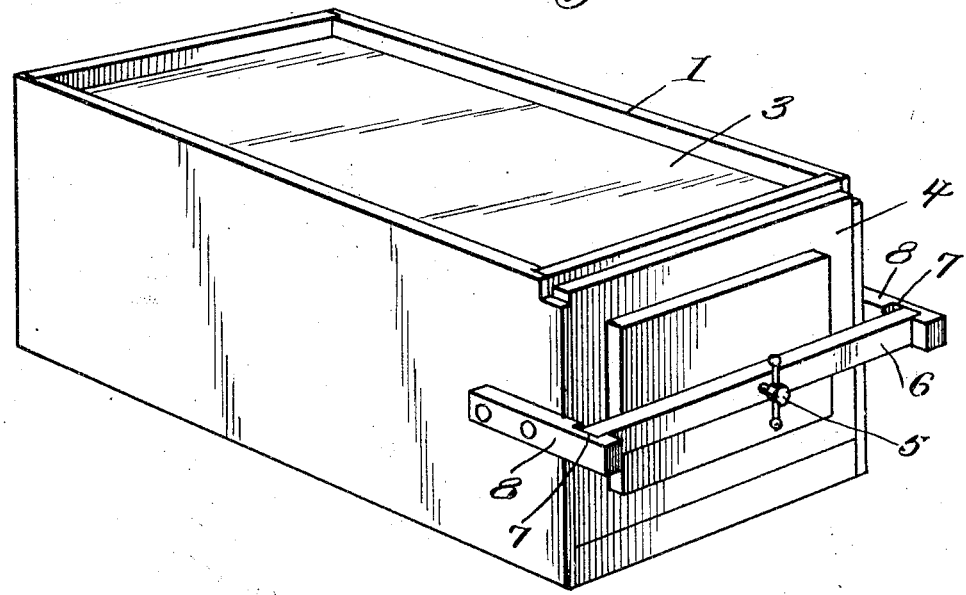
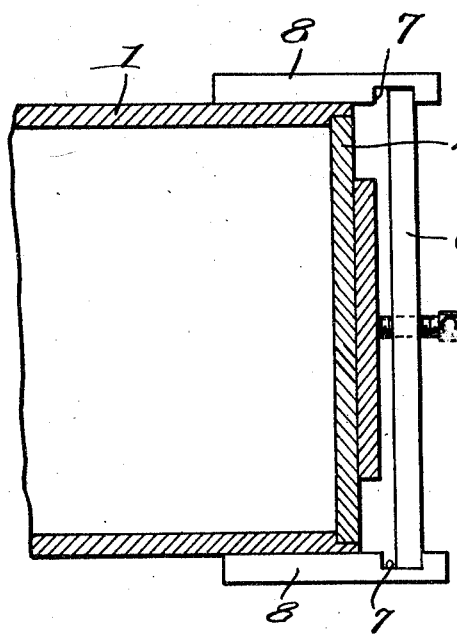
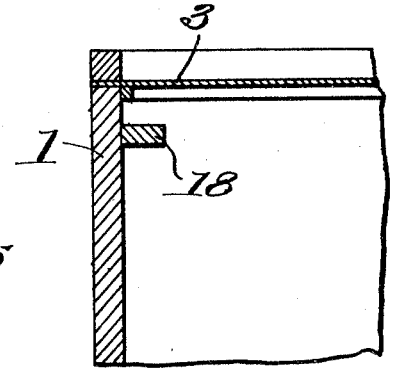
Arthur W. Parker, INVENTOR
BY Victor J. Evans
ATTORNEY July 9, 1929.  A. W. PARKER  1,720,491
FRUIT TREATING APPARATUS
Filed July 30, 1928   3 Sheets-Sheet 2
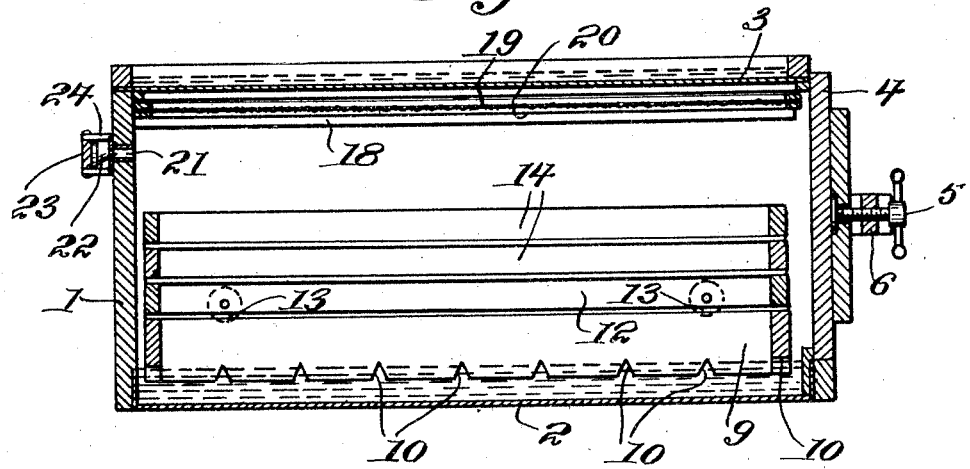
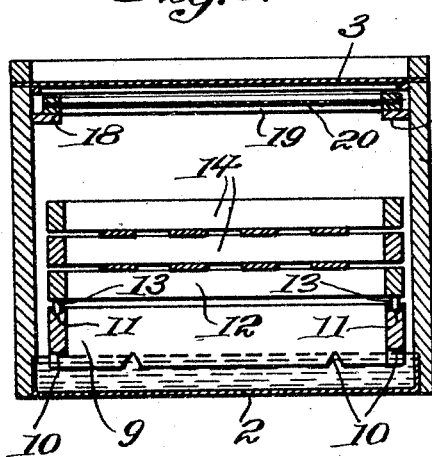
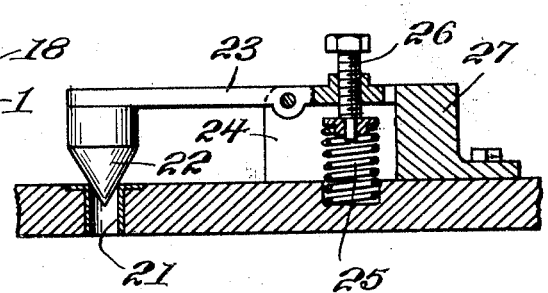
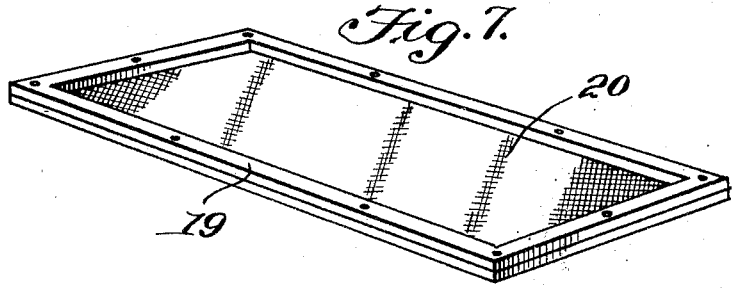
Arthur W. Parker INVENTOR
BY Victor J. Evans ATTORNEY July 9, 1929.  A. W. PARKER  1,720,491
FRUIT TREATING APPARATUS
Filed July 30, 1928   3 Sheets-Sheet 3
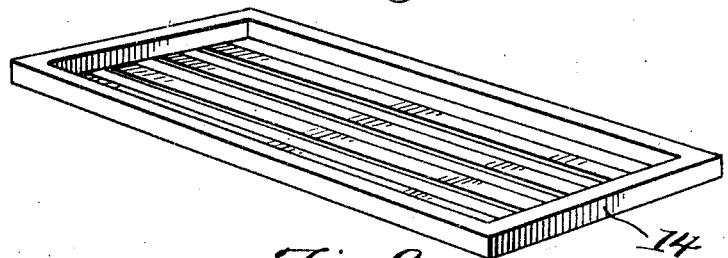
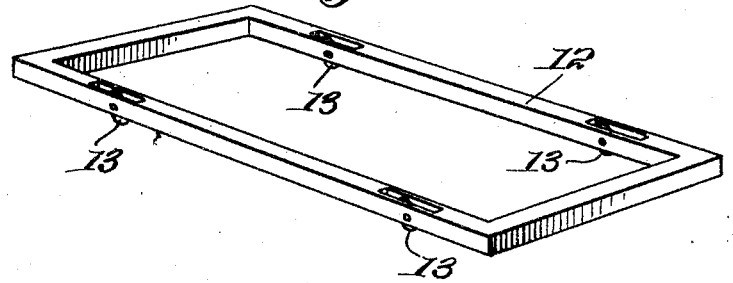
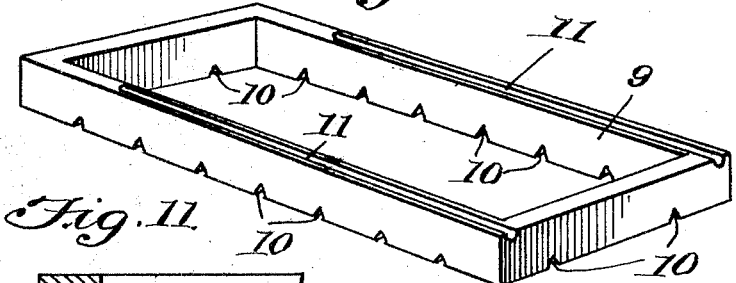
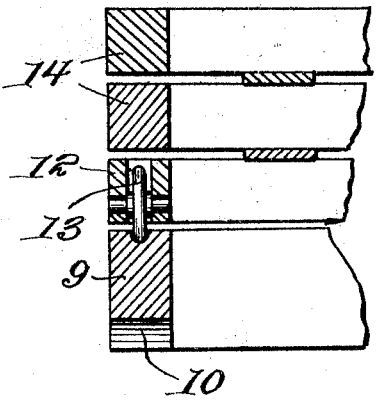
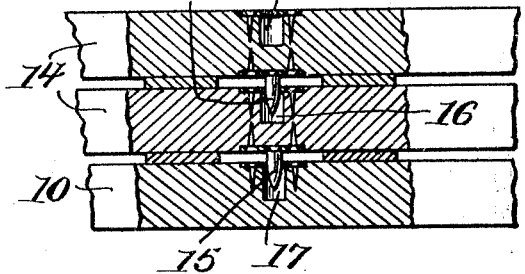
Arthur W. Parker INVENTOR
BY Victor J. Evans ATTORNEY Patented July 9, 1929.

1,720,491

UNITED STATES PATENT OFFICE.

ARTHUR W. PARKER, OF SAN JOSE, CALIFORNIA.

FRUIT-TREATING APPARATUS.

Application filed July 30, 1928. Serial No. 296,331.

This invention relates to an apparatus for treating fruit, the general object of the invention being to provide a casing having a tray at its bottom and a tray at its top for containing water, with means within the casing for holding trays of fruit and means at the top of the casing whereby the steam generated from the water in the lower tray, when the device is placed on a furnace or the like, will cause the steam, partly condensed by its contact with the water cooled bottom of the upper tray, to pass downwardly through the fruit on the trays and thus cook the same slowly.

A further object of the invention is to provide a float and a carriage seated on the float and which supports the trays so that the carriage and trays can be easily placed in the device and removed therefrom.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a perspective view of the device.

Figure 2 is a longitudinal sectional view thereof.

Figure 3 is a transverse sectional view.

Figure 4 is a sectional detail view showing the safety valve.

Figure 5 is a horizontal sectional view through the front part of the device.

Figure 6 is a fragmentary view through one of the upper corners of the device.

Figure 7 is a view of the canvas carrying frame.

Figure 8 is a view of one of the trays.

Figure 9 is a view of the carriage.

Figure 10 is a view of the float.

Figure 11 is a fragmentary sectional view showing the carriage with the trays thereon supported on the float.

Figure 12 is a fragmentary sectional view showing how the trays are detachably connected with each other and with the carriage.

In these views, the numeral 1 indicates a casing which is preferably formed of wood and 2 indicates a pan forming the bottom of the casing and 3 indicates a pan forming the top thereof. The pan 2 is preferably formed of copper, while the pan 3 is preferably formed with its bottom of copper and its sides of wood. Water is placed in both pans so that when the device is placed on a stove or the like, the steam generated from the water in the pan 2 will pass upwardly and strike the cool bottom of the pan 3 so that the steam will be partly condensed. One end of the casing is open and this open end is closed by a door 4 which is held steamtight by a screw 5 engaging a part of the door and carried by a cross bar 6, with its ends engaging notches 7 formed in the projecting bars 8 fastened to the sides of the casing at the front thereof. Thus by tightening the screw, the door will be held to its seat in a steamtight manner.

A rectangular-shaped frame 9, formed of wood or the like, is adapted to be passed through the door opening into the pan 2 so that it will float upon the water therein so that this frame forms a float. It is formed with the notches 10 in its lower edges so that water can readily reach the lower edges of the float and thus prevent burning of the float if the pan should become almost dry. A groove 11 is formed in each side member of the float at the top of the side member, these grooves passing through one end of the float and terminating short of the other end and a tray supporting frame 12 carries the rollers 13 for engaging the grooves, and by terminating the grooves short of the rear end of the float, the rear walls of the grooves form stops for limiting the movement of the carriage thereon.

The carriage is adapted to support the trays 14 which are provided with slotted bottoms, these trays being of ordinary construction and are adapted to hold the fruit to be treated by the apparatus. One end of each tray carries a depending pin 15 for engaging a socket 16 formed in the next lower tray with the pin of the bottom tray engaging a socket 17 in the end of the carriage, these pins and sockets acting to hold the trays against movement on the carriage and on each other.

Guide bars 18 are placed on the interior walls of the sides of the casing adjacent the top thereof for supporting a frame 19 which carries a sheet 20 of canvas or the like. This canvas covered frame is spaced from the interior walls of the casing as are the trays, the carriage and the float, so that the steam generated from the water in the pan 2 will pass up the space formed by the frames of the trays, the carriage and the float, as it cannot very well pass through the trays on account of the fruit placed thereon. This steam will pass around the edges of the canvas covered frame and come in contact with the bottom of the tray 3 which is cooled by the water in said tray so that the steam will be partly condensed and thus partly condensed steam will be forced through the canvas by the new steam flowing around the edges of the canvas covered frame, and thus the partly condensed steam will pass through the fruit on the trays and thus slowly cook the same. The water of condensation will drop back into the tray 2.

The passing of the partly condensed steam through the canvas acts to temper the steam so that it will slowly cook the fruit to a jelly without danger of burning the fruit, the process taking from one to three hours, according to the size and variety of the fruit being treated. If the fruit was acted on by uncondensed steam, it would burn in a few minutes, but as the live steam takes the path of least resistance around the edges of the frames, it will act on the partly condensed steam adjacent the bottom of the tray 3 and force the same through the canvas so that this partly condensed steam will act on the fruit.

I form a port 21 in the rear end of the casing adjacent the top thereof, and this port is controlled by a valve 22 carried by a lever 23 pivoted on a bracket 24 fastened to the casing, and this valve is normally held on its seat by a spring 25, the tension of which can be adjusted by a set screw 26 carried by the lever and having a part 27 on its inner end which engages the spring. Thus the valve forms a safety valve and said valve can be adjusted by turning the screw 26, as will be understood. By placing the trays on the carriage, the trays can be easily removed from the device and placed therein.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a casing, a water holding pan in the bottom of the casing, a water holding pan at the top of the casing whereby the steam generated from the water in the bottom pan will be partly condensed by contact with the top pan, fruit holding means in the casing between the pans and spaced from the walls of the casing whereby steam can pass around the holding means and a cloth covered frame in the casing under the top pan whereby the steam arising from the lower pan will act on the partly condensed steam under the top pan and force such partly condensed steam through the cloth upon the fruit in the holding means.

2. An apparatus of the class described comprising a casing, a water holding pan in the bottom of the casing, a water holding pan at the top of the casing whereby the steam generated from the water in the bottom pan will be partly condensed by contact with the top pan, fruit holding means in the casing between the pans and spaced from the walls of the casing whereby steam can pass around the holding means and a cloth covered frame in the casing under the top pan whereby the steam arising from the lower pan will act on the partly condensed steam under the top pan and force such partly condensed steam through the cloth upon the fruit in the holding means, such holding means comprising a float, a carriage on the float and trays carried by the carriage.

3. An apparatus of the class described comprising a casing, a water holding pan forming the bottom of the casing, a water containing pan forming the top of the casing, a frame floating upon the water in the lower pan, a carriage movably mounted on the said frame, fruit trays supported by the carriage, said float frame, the carriage and the trays being spaced from the walls of the casing and a cloth covered frame arranged in the upper part of the casing under the top pan.

4. An apparatus of the class described comprising a casing, a water holding pan forming the bottom of the casing, a water containing pan forming the top of the casing, a frame floating upon the water in the lower pan, a carriage movably mounted on the said frame, fruit trays supported by the carriage, said float frame, the carriage and the trays being spaced from the walls of the casing and a cloth covered frame arranged in the upper part of the casing under the top pan, said casing having an opening therein whereby the interior parts can be removed and a door closing the opening.

5. An apparatus of the class described comprising a casing, a water holding pan forming the bottom of the casing, a water containing pan forming the top of the casing, a frame floating upon the water in the lower pan, a carriage movably mounted on the said frame, fruit trays supported by the carriage, said float frame, the carriage and the trays being spaced from the walls of the casing, a cloth covered frame arranged in the upper part of the casing under the top pan, said casing having an opening therein whereby the interior parts can be removed, a door closing the opening and a safety valve in the upper part of the device.

In testimony whereof I affix my signature.

ARTHUR W. PARKER.